US010008709B2

(12) United States Patent
Osanai et al.

(10) Patent No.: US 10,008,709 B2
(45) Date of Patent: Jun. 26, 2018

(54) BUS BAR MODULE, BATTERY MONITORING MODULE, AND BATTERY MODULE

(71) Applicant: Panasonic Intellectual Property Management Co., Ltd., Osaka (JP)

(72) Inventors: Haruhiko Osanai, Kanagawa (JP); Koichi Sasaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

(21) Appl. No.: 15/221,704

(22) Filed: Jul. 28, 2016

(65) Prior Publication Data

US 2016/0336573 A1 Nov. 17, 2016

Related U.S. Application Data

(63) Continuation of application No. PCT/JP2015/002008, filed on Apr. 9, 2015.

(30) Foreign Application Priority Data

Apr. 17, 2014 (JP) ................... 2014-085174

(51) Int. Cl.
*H01M 2/20* (2006.01)
*H01M 2/10* (2006.01)
(Continued)

(52) U.S. Cl.
CPC ......... *H01M 2/206* (2013.01); *H01M 2/1077* (2013.01); *H01M 10/425* (2013.01);
(Continued)

(58) Field of Classification Search
CPC .. H01M 2/206; H01M 10/482; H01M 10/441; H01M 2/1077; H01M 10/425;
(Continued)

(56) References Cited

U.S. PATENT DOCUMENTS 6,261,719 B1    7/2001  Ikeda et al.
2013/0280959 A1*  10/2013  Takase ............... H01M 2/1077
                                                          439/627
(Continued)

FOREIGN PATENT DOCUMENTS

JP    2000-149909    5/2000
JP    2002-164034    6/2002
(Continued)

OTHER PUBLICATIONS

Extended European Search Report issued in European Patent Application No. EP 15 77 9419.9 dated Jan. 5, 2017.
(Continued)

*Primary Examiner* — Stewart A Fraser
(74) *Attorney, Agent, or Firm* — Pearne & Gordon LLP

(57) ABSTRACT

A bus bar module electrically connects in series a plurality of batteries stacked against each other in a row with alternately opposite polarities. This bus bar module has the plurality of bus-bars, and a housing part. The housing part includes a plurality of housing units for housing each of the plurality of the bus-bars such that the bus bars are movable along three axes. Each of the plurality of the bus-bars connects together electrodes of the two adjacent batteries among the plurality of the batteries, while being provided with two holes for loosely inserting the electrodes. Each of the plurality of housing units has a retaining part for retaining each of the plurality of the bus-bars inside each of the plurality of the housing units.

14 Claims, 5 Drawing Sheets

(51) Int. Cl.
*H01M 10/42* (2006.01)
*H01M 10/44* (2006.01)
*H01M 10/48* (2006.01)

(52) U.S. Cl.
CPC ....... H01M 10/441 (2013.01); H01M 10/482 (2013.01); *H01M 2010/4271* (2013.01); *H01M 2010/4278* (2013.01); *H01M 2220/20* (2013.01)

(58) Field of Classification Search
CPC ..... H01M 2010/4278; H01M 2220/20; H01M 2010/4271
See application file for complete search history.

(56) References Cited

U.S. PATENT DOCUMENTS

| | | | | |
|---|---|---|---|---|
| 2013/0302662 | A1* | 11/2013 | Ogasawara | H01M 2/206 429/158 |
| 2014/0287622 | A1* | 9/2014 | Kinoshita | H01M 2/206 439/595 |
| 2015/0070025 | A1* | 3/2015 | Nakayama | G01R 31/3658 324/434 |
| 2015/0147613 | A1* | 5/2015 | Hayashida | H01M 2/1072 429/90 |
| 2015/0287969 | A1* | 10/2015 | Nakayama | H01M 2/206 429/121 |

FOREIGN PATENT DOCUMENTS

| | | |
|---|---|---|
| JP | 2013-105571 | 5/2013 |
| WO | 2013/061870 A1 | 5/2013 |
| WO | 2013/183559 | 12/2013 |

OTHER PUBLICATIONS

International Search Report of PCT application No. PCT/JP2015/002008 dated Jun. 16, 2015.

* cited by examiner

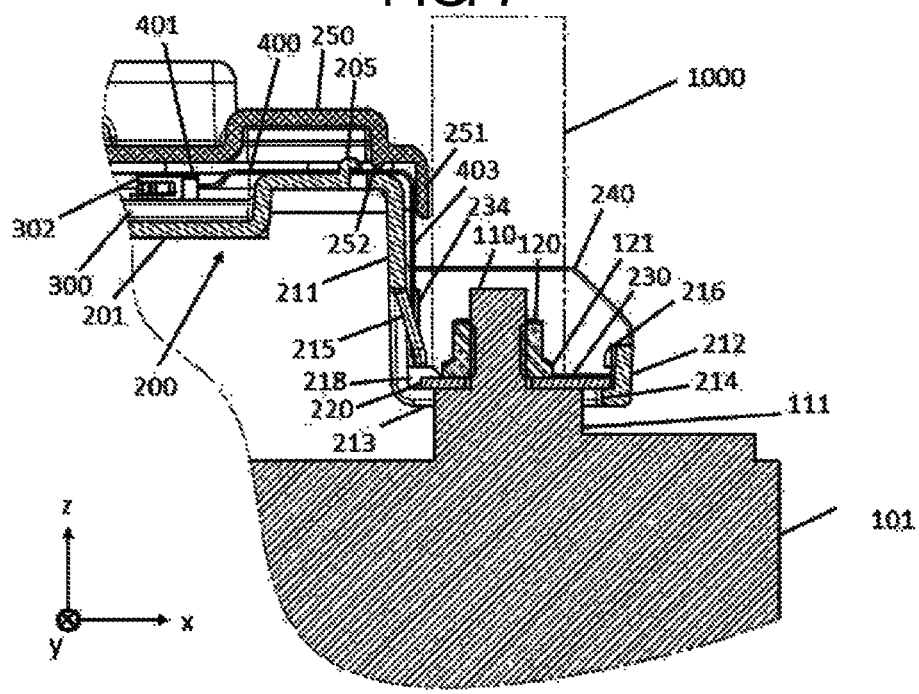
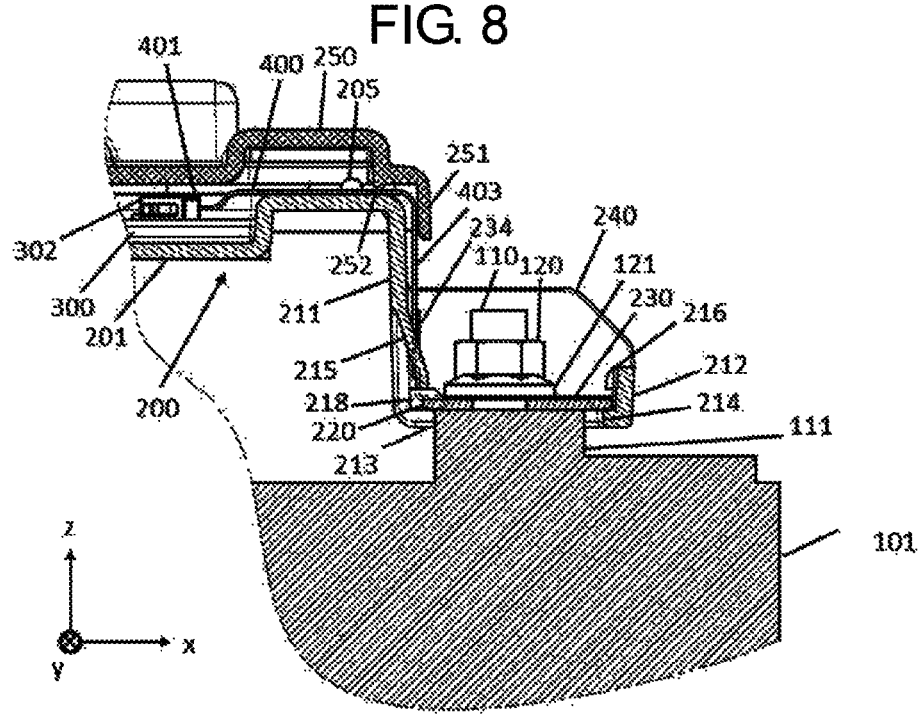

BUS BAR MODULE, BATTERY MONITORING MODULE, AND BATTERY MODULE

TECHNICAL FIELD

The present invention relates to a bus bar module for connecting a plurality of batteries in series as a power source of an electric vehicle or the like, a battery monitoring module using the same, and a battery module using the same.

BACKGROUND ART

Conventionally, in an electric vehicle or the like, a plurality of batteries connected in series is used as a power source having high voltage or high power. Connecting plates made of a synthetic resin, which is coupled to each of the batteries, has a cut-away portion or a flexible portion therebetween. In such a way, since the connecting plates have a contractility, the connecting plates can absorb the dispersion of the sizes between battery terminals by manufacturing allowance (for example, referring to Patent Literature 1 or 2.

CITATION LIST

Patent Literature

Patent Literature 1: Japanese Laid-Open Patent Publication No, 2000-149909
Patent Literature 2: Japanese Laid-Open Patent Publication No, 2002-164034

SUMMARY OF THE INVENTION

The present invention provides a bus bar module, which prevents a battery monitoring ECU (Electric Control Unit) from being damaged, and also absorbs the dispersion of the sizes between battery terminals.

A bus bar module of the present invention electrically connects in series a plurality of batteries stacked against each other in a row with alternately opposite polarities. This bus bar module has the plurality of bus-bars, and a housing part. The housing part includes a plurality of housing units for housing each of the plurality of the bus-bars such that the bus bars are movable along three axes. Each of the plurality of the bus-bars connects together electrodes of the two adjacent batteries among the plurality of the batteries, while being provided with two holes for loosely inserting the electrodes. Each of the plurality of housing units has a retaining part for retaining each of the plurality of the bus-bars inside each of the plurality of the housing units.

This configuration can prevent a battery monitoring ECU (Electric Control Unit) from being damaged, and also absorb the dispersion of the sizes between battery terminals.

BRIEF DESCRIPTION OF DRAWINGS

FIG. 7 is a sectional figure along a line VII-VII of FIG. 5 when it is seen in the plus direction of y axis.

FIG. 8 is a sectional figure along a line VIII-VIII of FIG. 5 when it is seen in the plus direction of y axis.

DESCRIPTION OF EMBODIMENTS

Problems in conventional connecting plates are briefly described before an embodiment of the present invention is described. Generally, ECU for monitoring or controlling battery states is mounted on a plurality of batteries coupled by the connecting plates. In order to have the versatility in response to increase or decrease of the number of the batteries, a printed circuit board having a battery monitoring function can be mounted on the connecting plates made of a synthetic resin. In this case, since the conventional connecting plates have a contractility as a whole, it is difficult to place the printed circuit board in a fixed position. On the other hand, when the connecting plates are made in a rigid structure such that the printed circuit board does not receive a stress, it is difficult to absorb the dispersion of the sizes between battery terminals.

A bus bar module, a battery monitoring module using the same, and a battery module using the same relating to the embodiment of the present invention, are explained below, referring to figures.

Figure 1:
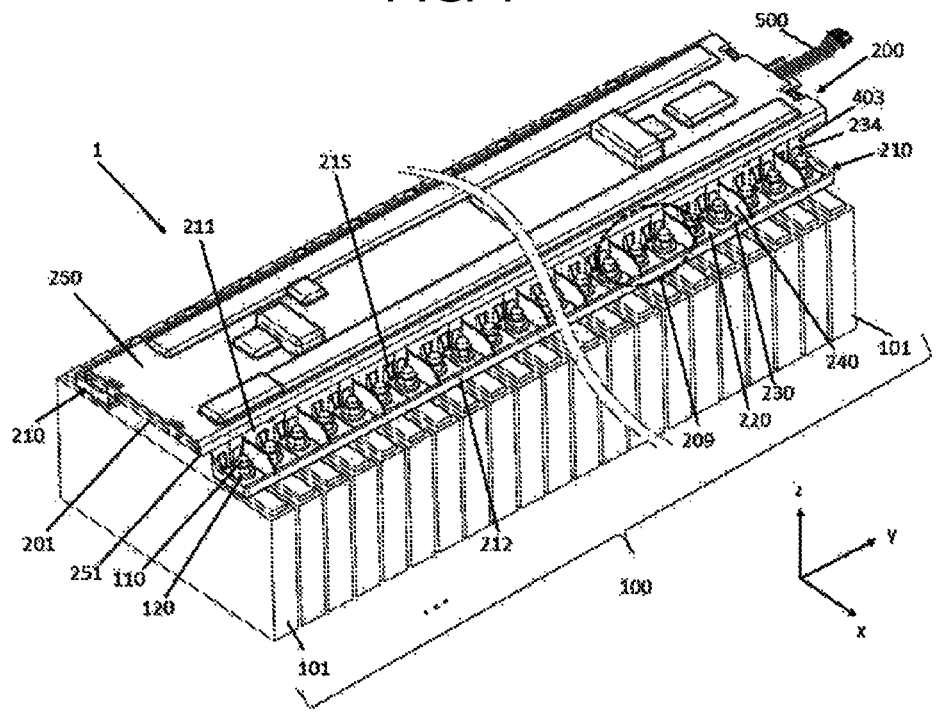
FIG. 1 is a whole perspective view of a battery monitoring module in an embodiment of the present invention.
Figure 2:
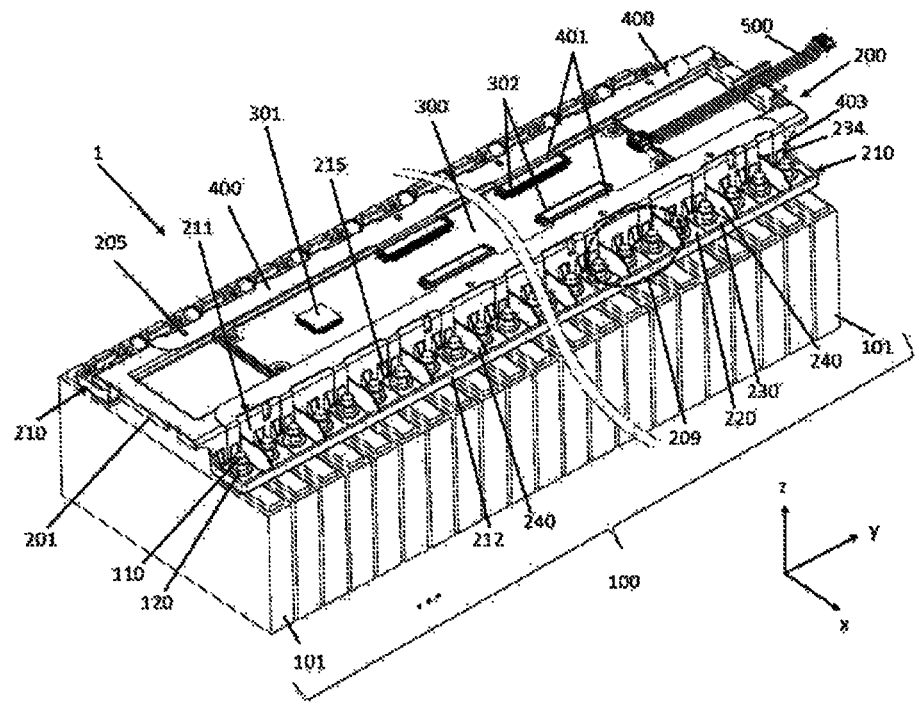
FIG. 2 is a whole perspective view of a state where a cover is removed from the battery monitoring module shown in FIG. 1.
Figure 3:
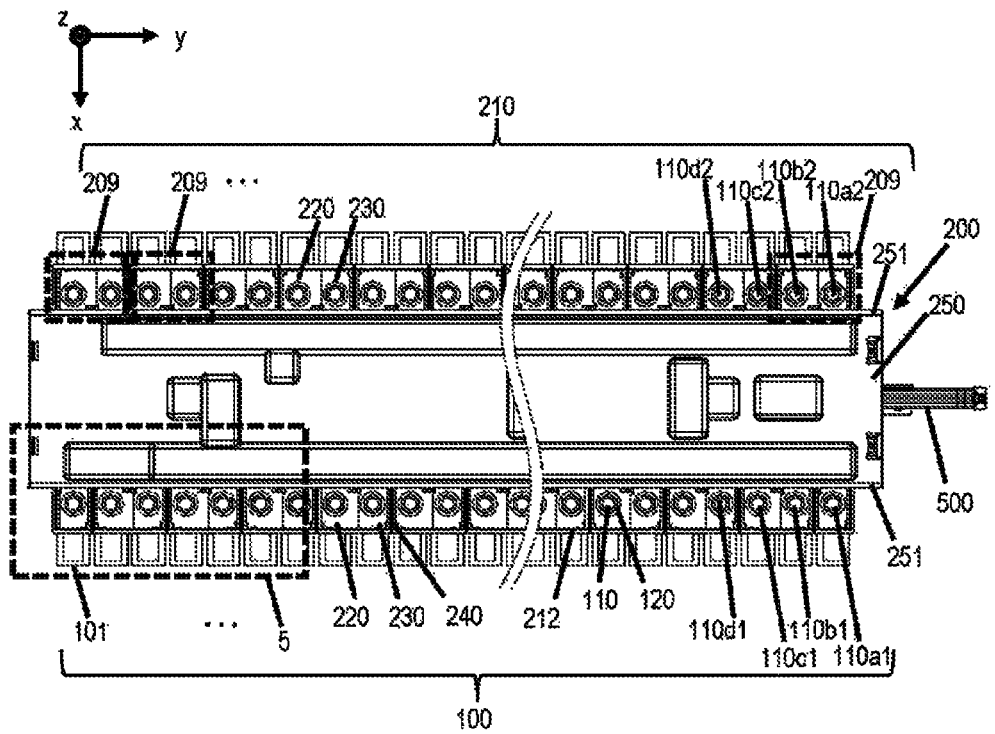
FIG. 3 is a plan view of the battery monitoring module shown in FIG. 1.
Figure 4:
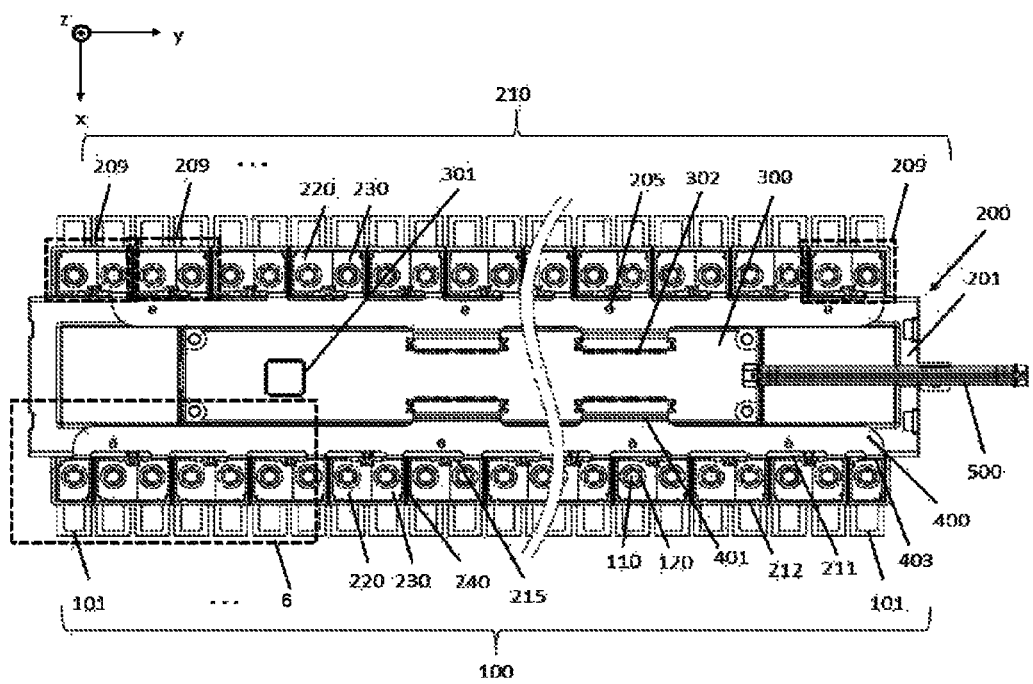
FIG. 4 is a plan view of the battery monitoring module shown in FIG. 2.
Figure 5:
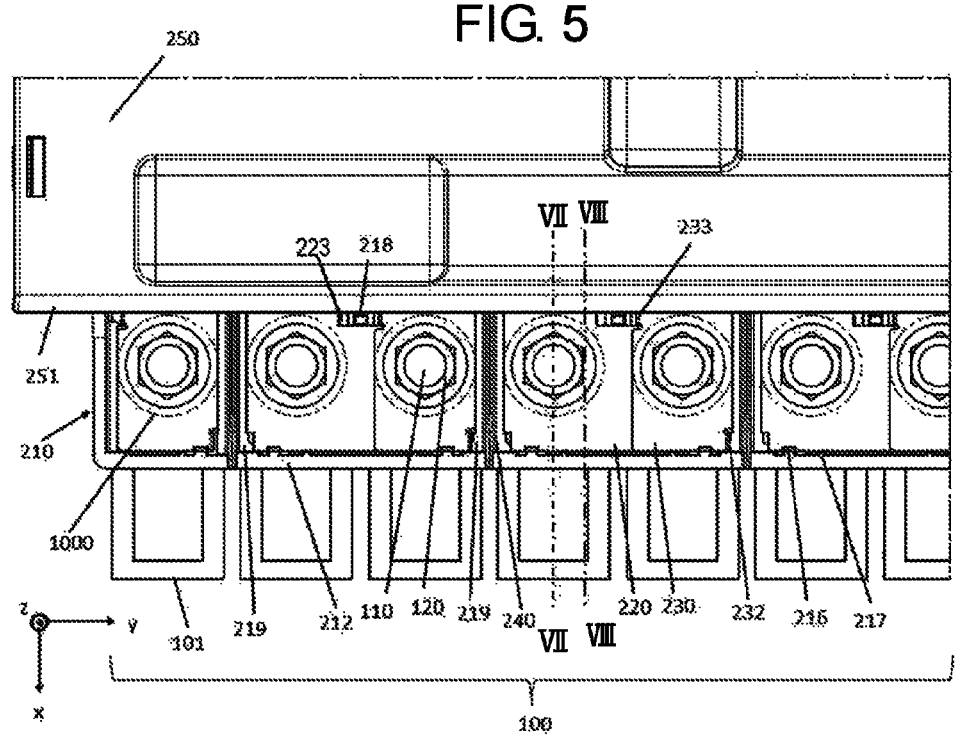
FIG. 5 is an enlarged figure of dashed line region 5 in FIG. 3.
Figure 6:
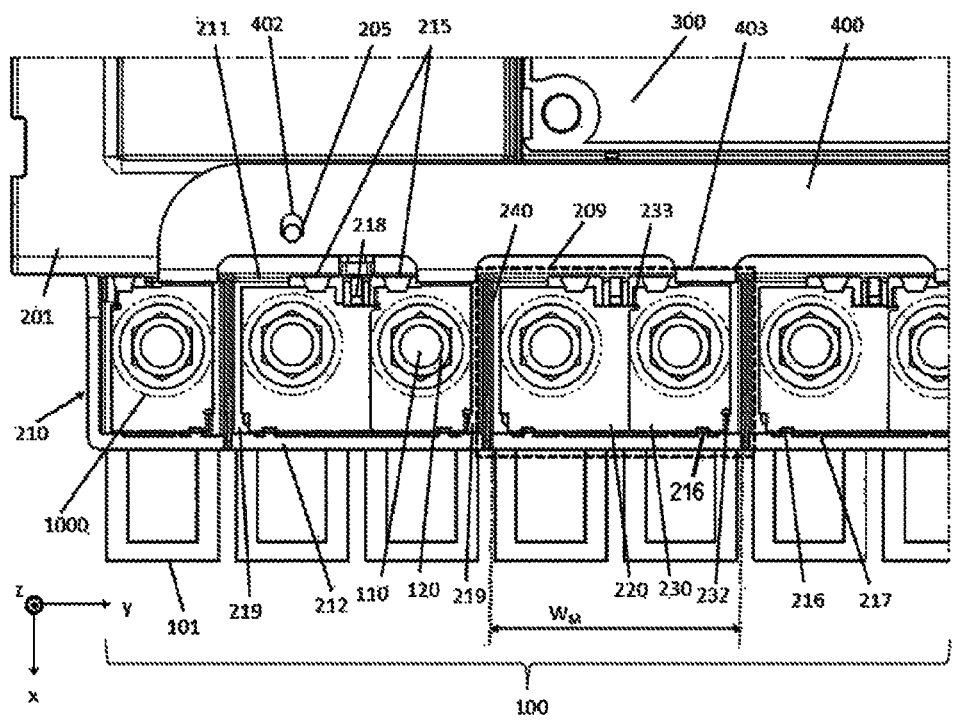
FIG. 6 is an enlarged figure of dashed line region 6 in FIG. 4.
Figure 9:
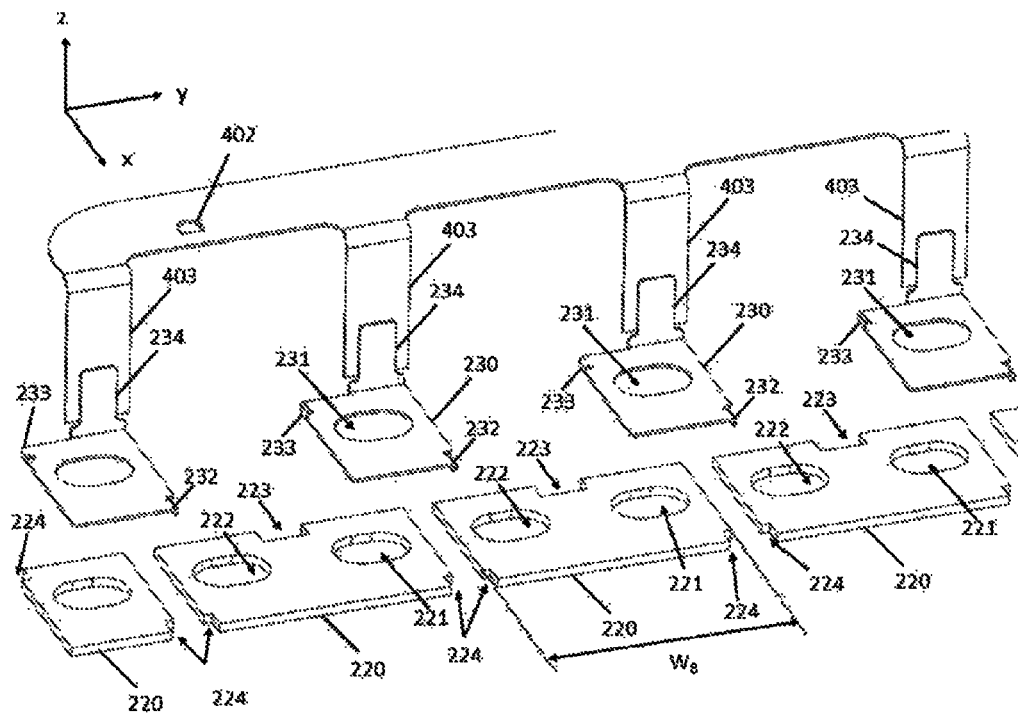
FIG. 9 is an exploded perspective view of bus-bars and voltage detecting terminals coupled to a flexible cable of FIG. 6.
Figure 10:
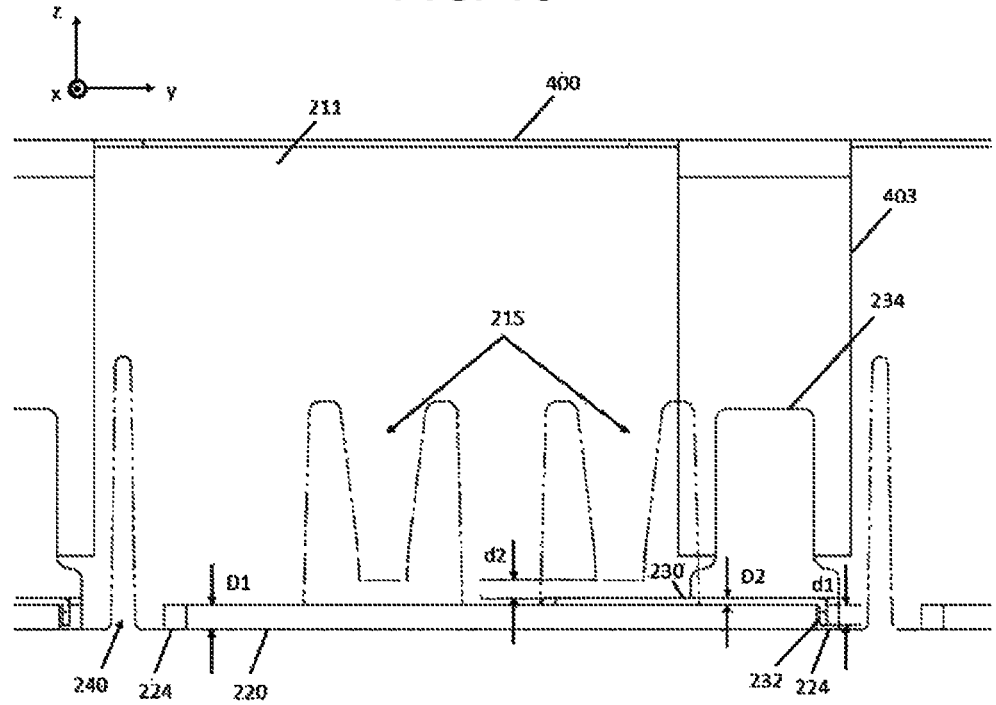
FIG. 10 is a front view in a state where the voltage detecting terminals of FIG. 9 are coupled to the bus-bars when it is seen in the minus direction of x axis.

FIG. 1 is a whole perspective view of battery module 1 in the embodiment. FIG. 2 is a whole perspective view of a state where cover 250 is removed from battery monitoring module 1 shown in FIG. 1. FIG. 3 is a plan view of FIG. 1. FIG. 4 is a plan view of FIG. 2. FIG. 5 is a enlarged figure of dashed line region 5 in FIG. 3. FIG. 6 is a enlarged figure of dashed line region 6 in FIG. 4, FIG. 7 is a sectional figure along a line VII-VII of FIG. 5 when it is seen in the plus direction of y axis. FIG. 8 is a sectional figure along a line VIII-VIII of FIG. 5 when it is seen in the plus direction of y axis. FIG. 9 is an exploded perspective view of bus-bars 220 and voltage detecting terminals 230 coupled to flexible cable 400. FIG. 10 is a front view in a state where voltage detecting terminals 230 of FIG. 9 are coupled to bus-bars 220 when it is seen in the minus direction of x axis.

Firstly, a whole structure of battery module 1 relating to the embodiment of the present invention, is explained.

As shown in FIG. 1 and FIG. 2, battery module 1 has battery assembly 100 where a plurality of batteries 101 are stacked against each other in a row, and bus bar module 200 electrically connecting in series the plurality of batteries 101. Battery module 1 is used as a power source for driving electric vehicles (EV), hybrid electric vehicles (HEV), plug-in hybrid electric vehicle (PHEV), or the like. Therefore, battery assembly 100 for battery module 1 is set at high power and high voltage.

Battery assembly 100 includes n pieces of batteries 101 of a rectangular parallelepiped shape (a prismatic shape). Battery assembly 100 is required to output high voltage. Then, for example, batteries 101 are lithium ion batteries having small size and high power, and about tens of batteries 101 are used in battery assembly 100. However, as long as battery assembly 100 meets required performance, battery assembly 100 is not limited to the above-mentioned configuration. Batteries 101 are arranged in a row direction (y direction). Each of batteries 101 has stud bolts 110 projecting upward (the z direction) as positive electrode or negative electrode at right and left ends (the x direction). Stud bolts 110 are also arranged in a row (y direction) in the same way as batteries 101. Adjacent batteries 101 are stacked such that polarities of stud bolts 110 arranged in y direction are alternately opposite. Namely, in battery assembly 100, the plurality of batteries 101 are stacked against each other in a row with alternately opposite polarities.

Bus bar module 200 has the plurality of bus-bars 220, and housing part 210. Each of the plurality of bus-bars 220 connects together stud bolts 110 of two adjacent batteries 101 among plurality of batteries 101, while being provided with two holes 221, 222 for loosely inserting stud bolts 110 (refer to FIG. 9). As described below, housing part 210 includes a plurality of housing units 209 for housing each of the plurality of bus-bars 220 such that bus bars 220 are movable along three axes. Housing part 210 also houses stud bolts 110 arranged in rows at right and left portions of batteries 101.

Further, bus bar module 200 has a plurality of voltage detecting terminals 230, flexible cables 400, cover 250, and nuts 120. Voltage detecting terminals 230, are electrically connected to stud bolts 110 mounted on bus-bars 220 respectively, to detect voltages of batteries 101. Flexible cables 400 are electrically connected to voltage detecting terminals 230. As shown in FIG. 7, FIG. 8, cover 250 has protecting parts 251 for protecting flexible cables 400, to cover flexible cables 400. Each nut 120 as fixing part fixes each stud bolt 110 to each bus-bar 220.

As mentioned above, bus bar module 200, printed circuit board 300 for monitoring voltage, and communication cable 500 constitutes a battery monitoring module. Printed circuit board 300 is mounted on bus bar module 200 between right and left rows of stud bolts 110. Printed circuit board 300 has a function of a monitoring module for monitoring each voltage of battery 101. Result (each information of batteries 101) of voltage monitoring in printed circuit board 300 are output to an external controlling ECU through communication cable 500. Here, flexible cables 400 connect voltage detecting terminals 230 and printed circuit board 300, to output voltage of each batteries 101 to printed circuit board 300. Cover 250 is coupled to the top portion of bus bar module 200, to protect electric circuits such as printed circuit board 300, or the like.

Housing part 210 includes the plurality of housing units 209 arranged in each of right and left rows. Central part 201 connects the right and left rows of housing unit 209. Housing units 209 and central part 201 constitute housing part 210 as one bus-bar case for housing bus-bars 220, made of a synthetic resin, and integrally molded. Housing part 210 is made of, for example, a polybutyrene telephthalate (PBT) resin, but it is not limited to this. Here, housing part 210 may be made of a material other than a synthetic resin. However, in housing part 210, insulation property and hardness are required. That is, housing part 210 at least insulates between battery assembly 100 and printed circuit board 300, or between batteries 101, and housing part 210 absorbs stress which is applied to printed circuit board 300.

As shown in FIG. 5, FIG. 6, each of housing unit 209 has inner side wall 211, outer side wall 212, and insulation walls 240. Insulation walls 240 are formed so as to connect inner side wall 211 and outer side wall 212, and then are insulated from batteries 101 of both sides. Mounting parts (not shown in figures) on which bus-bars 220 are mounted, are provided under ranges each surrounded by inner side wall 211, outer side wall 212, and insulation walls 240. Inner side wall 211 has resilient claw (piece) 215 projecting in the outer direction (the plus direction of x axis) from inner side wall 211. resilient claw 215 presses bus-bar 220 toward the inside of housing unit 209. This structure prevents bus-bar 220 or voltage detecting terminal 230 from coming off housing unit 209. Outer side wall 212 is formed as a side wall which covers a whole periphery of housing part 210.

As shown in FIG. 3, FIG. 4, housing units 209 at both end parts of the one row (the plus side row in the x direction), house stud bolt 110 of one battery 101. The other housing units 209 house two stud bolts 110 of two batteries 101. Stud bolts 110 are inserted in housing units 209. Nut 120 is screw connected to stud bolt 110 by using a tool such as a wrench, or the like. Thus, bus-bar 220, voltage detecting terminal 230, and housing unit 209 are sandwiched and fixed by corresponding battery 101 and nut 120. In this way, bus bar module 200 is fixed to battery assembly 100.

Within housing unit 209, stud bolts 110 of the positive and negative electrodes in two adjacent batteries 101 are connected by bus-bar 220. In contrast, outside housing units 209, stud bolts 110 of two adjacent batteries 101 are insulated each other by insulation walls 240. Accordingly, as shown in FIG. 3, the plurality of batteries 101 are connected in series by the plurality of bus-bars 220 and the plurality of insulation walls 240. Namely, negative stud bolt $110a2$ and positive stud bolt $110b2$ are connected, and negative stud bolt $110b1$ and positive stud bolt $110c1$ are connected, and negative stud bolts $110c2$ and positive stud bolt $110d2$ are connected. Further, negative stud bolt $110d1$ are connected to the positive stud bolt of battery 101 adjacent to it. By this structure, battery assembly 100 constitutes one assembled battery as a whole. Positive stud bolt $110a1$ functions as a positive electrode terminal of this assembled battery.

Each bus-bar 220 or each voltage detecting terminal 230 is made of a conductive meta board. Bus-bars 220 are mounted on the mounting parts (not shown in figures) of housing units 209, and voltage detecting terminals 230 are mounted on bus-bars 220. Two stud bolts 110 within housing unit 209 are inserted into holes of bus-bar 220, and one of stud bolts 110 of batteries 101 within housing unit 209 is inserted into the hole of voltage detecting terminal 230. Accordingly, in the structure where housing unit 209 houses stud bolts 110 of two batteries 101, voltage detecting terminal 230 is provided to the one of stud bolts 110. Concretely, other than first stud bolt $110a1$ as the positive electrode terminal part of battery assembly 100, voltage detecting terminals 230 are connected to the negative stud bolts.

The range of housing unit 209 surrounded by side wall 211, outer side wall 212, and insulation walls 240, has spatial play to bus-bar 220 in the three axes directions. Thus, bus-bar 220 can absorb manufacturing size allowance in each of batteries 101. Voltage detecting terminal 230 has spatial play to bus-bar 220 in the forward/backward and right/left directions (x y directions), and has spatial play to the range surrounded by side wall 211, outer side wall 212, and insulation walls 240 housing unit 209 in the top and bottom directions (z direction). Thus, voltage detecting terminal 230 can also absorb manufacturing size allowance in each of batteries 101.

Cover 250 is made of a synthetic resin in the same as housing part 210, and is provided at the upper position of bus bar module 200 (or battery monitoring module). Concretely, cover 250 is engaged with bus bar module 200 by lock claws at both end portions in the y direction of central portion 201, and covers printed circuit board 300, flexible cable 400, or connectors of communication cable 500, and insulates those from the outside. Protecting parts 251 extend at both end portions in the x direction of cover 250 downward (the minus direction of y axis).

As shown in FIG. 2, printed circuit board 300 has monitor IC 301 for monitoring voltage state of each battery 101 in battery assembly 100, and connectors 302 connected to flexible cables 400. Printed circuit board 300 is rigid, and is mounted at a recess of central portion 201, and is fixed to bus bar module 200 by, for example, rivets, or screws. Monitor IC 301 monitors voltage state of each battery 101, and is not limited to this, and may monitor other states. For example, it may monitor temperature state of each battery 101 by a thermistor (not shown in figures). Alternatively, it may monitor temperature at one or more portions in battery assembly 100.

Flexible cables 400 have connecting terminals 401 connected to connector 302, terminal connecting portions 403 connected to voltage detecting terminals 230. Positioning holes 402 (refer to FIG. 6) of flexible cable 400, are engaged with engaging claws 205 provided along the y direction at both end portions of the x direction of central portion 201.

A first end of communication cable 500 is connected to printed circuit board 300, and its second end is connected to the external device. This external device is, for example, ECU including control ICs for controlling battery assembly 100. ECU obtains voltage monitor information of each battery 101 taken by the monitor IC, to control charge or discharge of battery assembly 100.

Next, a structure that housing unit 209 prevents bus-bar 220 or voltage detecting terminal 230 from coming off, will be explained in detail.

As shown in FIG. 6, two resilient claws 215 and two guide claws 216 projecting from outer side wall 212, are provided respectively corresponding to the number of batteries 101 within housing unit 209. Guide claw 216 faces resilient claws 215. In FIG. 6, guide claw 216 diagonally faces resilient claw 215 interposing the mounting portion (not shown in figures), but it may face in front. Resilient claws 215, or resilient claws 215 and guide claws 216 constitute a retaining part for retaining bus-bar 220 inside housing unit 209.

Preferably, a length in the x axis direction between end portions of resilient claw 215 and guide claw 216 is set shorter than a length of bus-bar 220 or voltage detecting terminal 230 in the x axis direction. Namely, the interval of resilient claw 215 and guide claw 216 is smaller than the length of bus-bar 220 in the direction transverse to an arranged direction of holes 221, 222 (refer to FIG. 9).

Resilient claw 215 is deformable in the direction transverse to the arranged direction of holes 221, 222 of bus-bar 220. As shown in FIG. 7, FIG. 8, guide claw 216 is preferably inclined inward, and further resilient claw 215 is also preferably inclined inward. By these configurations, resilient claws 215, guide claws 216, push bus-bar 220 or voltage detecting terminal 230 from above, and when these are being mounted within housing unit 209, resilient claws 215, guide claws 215 can guide these. At this time, resilient claws 215 are pushed inward (in the minus x axis direction) by bus-bar 220 or voltage detecting terminal 230.

As shown in FIG. 7, FIG. 8, inside flange part 213 and outside flange part 214 are provided in housing unit 209. Inside flange part 213 projects from the lower part of inner side wall 211 to the inside of housing unit 209, and outside flange part 214 projects from the lower part of outer side wall 212 to the inside of housing unit 209. Bus-bar 220 is retained by inside flange part 213 and outside flange part 214, and voltage detecting terminal 230 is retained on bus-bar 220. In FIG. 7 or FIG. 8, stud bolts 110 of each battery 101 project from mounting part 111. Housing unit 209 including inside flange part 213 and outside flange part 214, or bus-bar 220 is mounted on mounting part 111. Since stud bolt 110 or mounting part 111 contacts bus-bar 220, each battery 101, bus-bar 220, and voltage detecting terminal 230 are electrically connected, nut 24 made of a metal is screw connected to the threaded bar 23 Then, Nut 120 is screw connected to stud bolt 110 by using an attaching tool or the like, and housing unit 209 or bus-bar 220 is fixed to mounting part 111.

As shown in FIG. 9, holes 221, 222 through which stud bolts 110 of two batteries 101 are inserted, are provided at bas-bar 220. Holes 221, 222 respectively have an enlonged hole shape in which a length in the y axis direction is bigger than a diameter of stud bolts 110, and can absorb manufacturing allowance in the row direction of batteries 101 (the y axis direction).

Cut-away portion 223 is provided at the center of the side along inner side wall 211 of bus-bar 220. As shown in FIG. 5, positioning pin 218 projecting from inner side wall 211, contacts cut-away portion 223. In the same way, positioning pins 217 projecting from outer side wall 212, contact bus-bar 220 at the side opposite to cut-away portion 223. Movements in the x axis direction of bus-bar 220 before screw connecting nut 120, is restricted within a fixed range by positioning pins 217, 218.

A length $W_M$ between adjacent insulation walls 240 shown in FIG. 6, is longer than a length $W_B$ in the y axis direction of bus-bar 220 shown in FIG. 9 ($W_M$>$W_B$). As shown in FIG. 5, FIG. 6, by this, gaps 219 are made at both sides of bus-bar 220 in the y axis direction in housing unit 209. Movements in the y axis direction of bus-bar 220 before screw connecting nut 120, is allowed within a fixed range.

Gaps 219 in the y axis direction is set at a longer size than that of gaps in the x axis direction between bus-bar 220 and positioning pins 217, 218. Battery assembly 100 is configured of batteries 101 stacked in the row in the y axis direction. Accordingly, manufacturing size allowance in the y axis direction of batteries 101 is accumulated. Gaps 219 can absorb this accumulated manufacture allowance. For example, gap 219 is set at about 1 mm, and the gap in the x axis direction between bus-bar 220 and positioning pins 217, 218 is set at about 0.1 mm.

In the y axis direction, the play of each hole 221, 222 to stud bolt 110 is set at a longer size than that of gap 219. Namely, in the direction in which batteries 101 are stacked, the gap between stud bolt 110 of each battery 101 and holes 221, 222 of bus-bar 220, is longer than the gap between bus-bar 220 and housing unit 209. Thus, in the y axis direction, bus-bar 220 can absorb manufacturing size allowance of batteries 101 as much as possible, and can prevent increasing in size by increasing the length of housing unit 209. Here, when increasing in size of bus bar module 200 is allow, play of hole 221, hole 222 to stud bolt 110 may be set at a shorter size than that of gap 219. In this case, the length of bus-bar 220 on the xy plane around holes 221, 222, does not become short. Accordingly, strength decrease of bus-bar 220 of itself can be suppressed, and decrease of contacting area of bus-bar 220 and battery 101 can be suppressed. For example, gap 219 is set at about 1 mm, and the play of hole 221, 222 to the stud bolt can be set at about several mm.

As shown in FIG. 9, voltage detecting terminal 230 has hole 231 into which negative stud bolt 110 of battery 101 is inserted, connecting part 234 vertically bent and connected to terminal connecting part 403 of flexible cable 400. Further, voltage detecting terminal 230 preferably has at least one of bending portions 232, 233. Bending portion 232 bent downward (the minus z axis direction), is inserted into cut-away portion 224 provided at an outer corner of bus-bar 220. Bending portion 233 bent downward (the minus z axis direction), is inserted into cut-away portion 223. Bending portions 232, 233 are respectively formed at a pair of sides in the y axis direction of voltage detecting terminal 230. Thus, movements in the forward/backward and right/left directions (x y directions) of voltage detecting terminal 230 is restricted in a fixed range. Hole 231 has the same shape as hole 221.

As shown in FIG. 5-FIG. 8, when bus-bar 220 and voltage detecting terminal 230 try to move upward more than a predetermined distance, the tip of resilient claws 215 are provided so as to contact these. At the time before connecting nut 120, this configuration prevents bus-bar 220 and voltage detecting terminal 230 from moving upward (the plus z axis direction) and coming off housing unit 209. For example, resilient claw 215 and guide claw 216 are provided such that the length in the x axis direction between resilient claw 215 and guide claw 216 is set shorter than the length of the side of bus-bar 220 or voltage detecting terminal 230. Here, there is a possibility that when the outer side of bus-bar 220 or voltage detecting terminal 230 comes closest to outer side wall 212 (contacts positioning pin 217), bus-bar 220 or voltage detecting terminal 230 rotates around the outer side as a pivot. Even in this case, resilient claw 215 is appropriately provided such that the inner side of bus-bar 220 or voltage detecting terminal 230 contacts resilient claw 215.

By the above arrangement relation of housing unit 209, bus-bar 220, and voltage detecting terminal 230, it absorbs the dispersion of stud bolts 110 of batteries 101, and it can retain bus-bar 220 and voltage detecting terminal 230 without coming off housing unit 209.

In this embodiment, voltage detecting terminal 230 connected to flexible cable 400, is separated from bus-bar 220. Thus, tensile strength applied to terminal connecting part 403 according to movements of flexible cable 400 in the top and bottom directions, can be reduced. Then, the following trouble breakdown of the whole of bus bar module 200 can be reduced. Namely, when nut 120 is screw connected to stud bolt 110, terminal connecting part 403 and connecting part 234 are cut. Especially, as understood by comparing voltage detecting terminal 230 with bus-bar 220 in projected areas in FIG. 10, thickness D2 of voltage detecting terminal 230 is set to be smaller than thickness D1 of bus-bar 220, and then voltage detecting terminal 230 can become light. Thus, the tensile strength applied to flexible cable 400 can be further reduced.

Preferably, a length d2 of the gap in the z axis direction between voltage detecting terminal 230 and resilient claw 215 is set shorter than a length d1 of bending portion 232 at cut-away portion 224. Namely, the distance between voltage detecting terminal 230 and resilient claw 215 is shorter than the inserting length of bending portion 232 into cut-away portion 244. This structure can retain voltage detecting terminal 230 without coming off bus-bar 220. Cut-away portion 223 and bending portion 233 are also set in the same way.

In this embodiment, protecting parts 251 are provided both end portions in the x direction of cover 250 in order to protect terminal connecting part 403 of flexible cable 400. Namely, cover 250 has protecting parts 251 for protecting flexible cable 400, and covers flexible cable 400. By this structure, in a case where flexible cable 400 flexes, such a movement can be corrected. Then, interference between flexible cable 400 and the tool for screwing nut 120 can be prevented. This is explained in detail below.

As shown in FIG. 7, when nut 120 is screw connected, a space in the plus and minus x axis direction is needed for outer diameter 1000 of the tool such as a wrench more than nut 120. At the time of working of connecting the nut, as voltage detecting terminal 230 moves in the top and bottom directions (the z direction), flexible cable 400 connected to voltage detecting terminal 230 also moves in the top and bottom directions. In detail, cover 250 has contacting pins 252 on the back surface of cover 250, and flexible cable 400 is sandwiched and retained between contacting pins 252 and bus bar module 200. Therefore, in flexible cable 400, parts outside contacting pins 252 (in the plus x axis direction) mainly flex. In a case where terminal connecting part 403 along inner side wall 211 flexes outward, there is a trouble that flexible cable 400 is broken by touching the tool. However, since protecting parts 251 are provided for covering terminal connecting part 403 from outside, it can prevent terminal connecting part 403 from projecting outward. Namely, protecting part 251 suppresses flexible cable 400 to move toward stud bolt 110.

Additionally, since a space is provided above terminal connecting part 403, protecting part 251 guides terminal connecting part 403 to upward when terminal connecting part 403 flexes. Thus, it further can prevent terminal connecting part 403 from projecting outward. Namely, preferably, a space which houses flexing part of flexible cable 400 is provided between protecting part 251 and flexible cable 400.

In order to maintain working efficiency where nut 120 is connected to stud bolt 110, as shown in FIG. 5, FIG. 7, the outer edge of protecting part 251 is located inside (the minus x axis direction) the outer diameter of the tool which connects nut 120. The outer diameter of the tool is a value where a predetermined value is added to the outer diameter of nut 120. This predetermined value is arbitrary, and may be set at a value according to the outer diameter of nut 120, referring to standards of tools (for example, JIS (Japanese Industrial Standard) B 4636). In order to commonize design as a structure available regardless of outer diameter of nut 120, the predetermined value may be set at a fixed value, for example, about several mm, and may be set at the maximum value prescribed in standards.

As mentioned above, bus bar module 200 has bus-bars 220, and housing part 210 having housing units 209. Two holes 221, 222 through which stud bolts 110 of adjacent batteries 101 are loosely inserted, are provided at bas-bar 220. Housing unit 209 houses bus-bar 220 so as to be moveable in the tree axes directions. Housing unit 209 has resilient claw 215 as the retaining part for retaining bus-bar 220 inside housing unit 209. This absorbs the dispersion in intervals of terminals (stud bolts 110) of batteries 101, and prevents bus-bar 220 from coming off housing unit 209. Then, the manufacturing size allowance of batteries 101 can be absorbed by the movements of bus-bar 220 in the 3 axes directions. Housing part 210 of itself does not flex in order to absorb manufacturing size allowance of batteries 101. Thus, even though printed circuit board 300 is mounted on bus bar module 200, stress applied to printed circuit board 300 can be prevented. Damage or breakdown of printed circuit board 300 or monitor IC 301 can be reduced.

The invention is not limited to the above-mentioned configuration, n be applied to yield many other variants without departing from the concepts of the inventions. The above-mentioned embodiments are used as examples, and the scope of the invention is in no way limited to those embodiments.

For example, the polarity of stud bolt 110 may be opposite. Concretely, in the embodiment, voltage detecting terminal 230 is connected to negative stud bolt 110 of each batteries 101, but voltage detecting terminal 230 may be connected to positive stud bolt 110. Batteries 101 are arranged such that the polarities of adjacent stud bolts 110 are opposite, and the polarities of voltage detecting terminal 230 and stud bolt 110 connected to this are unified to any one of positive or negative ones in each batteries 101.

INDUSTRIAL APPLICABILITY

The bus bar module relating to the present invention is used as a bus bar module in which the monitor ECU for monitoring batteries used as a power source of an electric vehicle is included.

The invention claimed is:

1. A bus bar module for electrically connecting in series a plurality of batteries stacked against each other in a row with alternately opposite polarities, comprising:
    a plurality of bus-bars;
    a housing part including a plurality of housing units for housing each of the plurality of the bus-bars such that the bus bars are movable along three axes,
    a plurality of voltage detecting terminals for detecting a voltage in each of the plurality of the batteries, and mounted on each of the plurality of the bus-bars; and
    a flexible cable electrically connected to the plurality of the voltage detecting terminals,
    wherein each of the plurality of the bus-bars connects together electrodes of two adjacent batteries among the plurality of the batteries, while being provided with two holes for loosely inserting the electrodes,
    each of the plurality of housing units has a retaining part for retaining each of the plurality of the bus-bars inside each of the plurality of the housing units,
    the retaining part retains each of the plurality of the voltage detecting terminals in each of the plurality of housing units,
    a cut-away portion is provided at each of the plurality of the bus-bars,
    each of the plurality of the voltage detecting terminals has a bending portion inserted into the cut-away portion, and
    when each of the plurality of the voltage detecting terminals moves in the direction in which the plurality of the batteries are stacked, the bending portion engages the cut-away portion of each of the plurality of the bus-bars to restrict movement of each of the plurality of the voltage detecting terminals.

2. The bus bar module according to claim 1, wherein the retaining part has a resilient claw deformable in a direction transverse to an arranged direction of the two holes in each of the plurality of the bus-bars.

3. The bus bar module according to claim 2, wherein the retaining part has a guide claw which opposes the resilient claw, and guides each of the plurality of the bus-bars to each of the plurality of the housing units together with the resilient claw, and an interval of the resilient claw and the guide claw is smaller than a length in the direction transverse to the arranged direction of the two holes in each of the plurality of the bus-bars.

4. The bus bar module according to claim 1, wherein, in the direction in which the plurality of the batteries are stacked, a gap between an electrode of each of the plurality of the batteries and one of the two holes of each of the plurality of the bus-bars, is longer than a gap between each of the plurality of the bus-bars and each of the plurality of the housing units.

5. The bus bar module according to claim 1, wherein a distance between each of the plurality of the voltage detecting terminals and the resilient claw is shorter than an inserting length of the bending portion into the cut-away portion.

6. The bus bar module according to claim 1, further comprising:
    a protecting part which protects the flexible cable; and
    a cover which covers the flexible cable.

7. The bus bar module according to claim 6, wherein the protecting part suppresses the flexible cable to move toward the electrode of each of the plurality of the batteries.

8. The bus bar module according to claim 7, wherein a space which houses a flexing part of the flexible cable is provided between the protecting part and the flexible cable.

9. The bus bar module according to claim 8, further comprising:
    a plurality of fixing parts each fix each of the plurality of the bus-bars to the electrode of each of the plurality of the batteries,
    wherein the protecting part is more apart from a center of each of the plurality of the housing units than each of the plurality of the fixing parts is.

10. A battery monitoring module comprising:
    the bus bar module according to claim 1;
    a monitoring module for monitoring a voltage of each of the plurality of the batteries; and
    a communication cable through which voltage information monitored by the monitoring module is output outside.

11. The battery monitoring module according to claim 10, wherein the bus bar module further includes:
    a plurality of voltage detecting terminals for detecting a voltage in each of the plurality of the batteries, and mounted on each of the plurality of the bus-bars; and
    a flexible cable electrically connected to the plurality of the voltage detecting terminals, and through which information in each of the plurality of the batteries is output, and
    wherein the retaining part retains each of the plurality of the voltage detecting terminals in each of the plurality of housing units.

12. The battery monitoring module according to claim 11, further comprising:
    a protecting part which protects the flexible cable; and
    a cover which covers the flexible cable and the monitoring module.

13. A battery module comprising:
    the bus bar module according to claim 1; and
    a battery assembly including the plurality of the batteries which are electrically connected in series by the bus bar module.

14. The battery module according to claim 13, further comprising:
- a monitoring module for monitoring a voltage of each of the plurality of the batteries; and
- a communication cable through which voltage information monitored by the monitoring module is output outside.

\* \* \* \* \*